United States Patent
Lin et al.

(10) Patent No.: US 10,113,081 B2
(45) Date of Patent: Oct. 30, 2018

(54) WATER DILUTABLE POLYVINYL FLUORIDE PAINT AND COATING AND METHOD FOR MANUFACTURING THE SAME

(71) Applicant: GRAND TEK ADVANCE MATERIAL SCIENCE CO., LTD., Taipei (TW)

(72) Inventors: Hsueh-Tso Lin, Hsinchu (TW); Rui-Gang Hou, Taipei (TW); Dick Zhong, Arcadia, CA (US)

(73) Assignee: GRAND TEK ADVANCE MATERIAL SCIENCE CO., LTD., Taipei (TW)

( * ) Notice: Subject to any disclaimer, the term of this patent is extended or adjusted under 35 U.S.C. 154(b) by 165 days.

(21) Appl. No.: 15/238,112

(22) Filed: Aug. 16, 2016

(65) Prior Publication Data
US 2017/0240761 A1    Aug. 24, 2017

(30) Foreign Application Priority Data

Feb. 22, 2016  (TW) .............................. 105105090 A
Jul. 25, 2016  (TW) .............................. 105123391 A

(51) Int. Cl.
*C09D 127/14* (2006.01)
*B32B 27/28* (2006.01)
*C08J 7/04* (2006.01)
*B05D 7/00* (2006.01)
*C09D 5/00* (2006.01)

(52) U.S. Cl.
CPC ............. *C09D 127/14* (2013.01); *B05D 7/50* (2013.01); *C08J 7/047* (2013.01); *C09D 5/002* (2013.01); *C08J 2327/14* (2013.01); *C08J 2427/14* (2013.01)

(58) Field of Classification Search
CPC .................................................. C09D 127/14

USPC ................. 428/422; 427/407.1; 524/546
See application file for complete search history.

(56) References Cited

U.S. PATENT DOCUMENTS

| | | | |
|---|---|---|---|
| 2,953,818 A | 9/1960 | Barton | |
| 3,139,470 A | 6/1964 | Prengle et al. | |
| 4,557,977 A * | 12/1985 | Memmer | B05D 7/16 283/81 |
| 4,786,546 A | 11/1988 | Vassiliou | |
| 5,753,316 A * | 5/1998 | Brent | B05D 7/14 427/379 |
| 2005/0032968 A1* | 2/2005 | Drujon | C08L 27/16 524/515 |
| 2012/0231379 A1* | 9/2012 | Nukada | G03G 5/0525 430/56 |
| 2014/0113144 A1* | 4/2014 | Loth | C09D 5/1662 428/421 |
| 2015/0267061 A1* | 9/2015 | Huesmann | B05D 3/007 428/418 |

* cited by examiner

*Primary Examiner* — Tae H Yoon
(74) *Attorney, Agent, or Firm* — Muncy, Geissler, Olds & Lowe, P.C.

(57) ABSTRACT

A method of manufacturing a coating is provided, which includes applying a primer paint on a substrate, wherein the primer paint includes 100 parts by weight of a first PVF, 30-70 parts by weight of an assistance resin, 5-30 parts by weight of a curing agent, 100-120 parts by weight of a first latent solvent, 3-methoxy-3-methyl-1-butanol, and water. The first latent solvent, 3-methoxy-3-methyl-1-butanol, and water have a weight ratio of 60:10-20:40-60. The method also applies a finish paint on the primer paint, wherein the finish paint includes 100 parts by weight of a second PVF, 100-120 parts by weight of a second latent solvent, 3-methoxy-3-methyl-1-butanol, and water, wherein the second latent solvent, 3-methoxy-3-methyl-1-butanol, and water have a weight ratio of 50:10-20:30-60. The primer paint and the finish paint are baked and dried to form a coating.

13 Claims, No Drawings

WATER DILUTABLE POLYVINYL FLUORIDE PAINT AND COATING AND METHOD FOR MANUFACTURING THE SAME

CROSS REFERENCE TO RELATED APPLICATIONS

This Application claims priority of Taiwan Patent Application No. 105123391, filed on Jul. 25, 2016, and Taiwan Patent Application No. 105105090, filed on Feb. 22, 2016, the entirety of which is incorporated by reference herein.

BACKGROUND

Technical Field

The disclosure relates to polyvinyl fluoride paint, and in particular it relates to water dilutable polyvinyl fluoride paint.

Description of the Related Art

Polyvinyl fluoride (PVF) paints have excellent physical and chemical properties such as acid/base resistance, impact resistance, non-toxicity, flexibility, abrasion resistance, and the like. These PVF paints also have water resistance and excellent climate resistance. Compared to other fluorine-containing coatings such as poly(chlorotrifluoroethylene) (PCTFE), poly(tetrafluoroethylene) (PTFE), and poly(vinylidene difluoride) (PVDF), PVF paints can be baked at a relatively low temperature.

The solvent-based PVF paint is mainly composed of PVF resin, latent solvent, colorant, and thermal stabilizer. The latent solvent should collocate with other solvent to stabilize the paint system, thereby increasing the volatile organic compound (VOC) content of the PVF paint system. The suitable latent solvent for the PVF can be referred to U.S. Pat. No. 2,953,818 and U.S. Pat. No. 3,139,470. U.S. Pat. No. 4,786,546 discloses a primer paint composed of 20 wt % to 40 wt % of an acrylate copolymer with a specific structure and 80 wt % to 60 wt % of PVF, and a finish paint of PVF. The primer paint is sprayed, and the finish paint can be directly sprayed on the primer paint without pre-baking the primer paint. The wet-to-wet paints may achieve the two coating and one baking effect, but the paints belong to a solvent-based system. The solvent-based paint will release the VOC to atmosphere during manufacturing, processing, drying, curing, and film formation, which is one of the major environmental pollutants to seriously damage the human health and environment. Therefore, many countries of the world make corresponding laws or rules to limit the VOC release amount from the paints. As such, reducing the VOC of the PVF paints is called for.

BRIEF SUMMARY

One embodiment of the disclosure provides a water dilutable polyvinyl fluoride paint, comprising: 100 parts by weight of a first polyvinyl fluoride; 30-70 parts by weight of an assistance resin; 5-30 parts by weight of a curing agent; 100-120 parts by weight of a latent solvent; 3-methoxy-3-methyl-1-butanol; and water, wherein the latent solvent, 3-methoxy-3-methyl-1-butanol, and water have a weight ratio of 60:10-20:40-60.

One embodiment of the disclosure provides a water dilutable polyvinyl fluoride paint, comprising: 100 parts by weight of a second polyvinyl fluoride; 100-120 parts by weight of a latent solvent; 3-methoxy-3-methyl-1-butanol; and water, wherein the latent solvent, 3-methoxy-3-methyl-1-butanol, and water have a weight ratio of 50:10-20:30-60.

One embodiment of the disclosure provides a coating, comprising: a primer coating, including a product of reacting 100 parts by weight of a first polyvinyl fluoride; 30-70 parts by weight of an assistance resin; and 5-30 parts by weight of a curing agent; and a finish coating on the primer coating, wherein the finish coating includes 100 parts by weight of a second polyvinyl fluoride.

One embodiment of the disclosure provides a method of manufacturing a coating, comprising: applying a primer paint on a substrate, wherein the primer paint includes 100 parts by weight of a first polyvinyl fluoride, 30-70 parts by weight of an assistance resin, 5-30 parts by weight of a curing agent, 100-120 parts by weight of a first latent solvent, 3-methoxy-3-methyl-1-butanol, and water, wherein the first latent solvent, 3-methoxy-3-methyl-1-butanol, and water have a weight ratio of 60:10-20:40-60; applying a finish paint on the primer paint, wherein the finish paint includes 100 parts by weight of a second polyvinyl fluoride, 100-120 parts by weight of a second latent solvent, 3-methoxy-3-methyl-1-butanol, and water, wherein the second latent solvent, 3-methoxy-3-methyl-1-butanol, and water have a weight ratio of 50:10-20:30-60; and baking and drying the primer paint and the finish paint to form a coating.

A detailed description is given in the following embodiments.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

One embodiment of the disclosure provides a method of manufacturing a coating, including applying a primer paint onto a substrate. The substrate can be aluminum metal or aluminum alloy treated by sandblasting or chromate coating, zinc-plated iron treated by chromate coating, aluminum zinc-plated iron treated by chromate coating, or stainless steel treated by chromate coating. The primer paint includes 100 parts by weight of a polyvinyl fluoride (PVF), 30-70 parts by weight of an assistance resin, 5-30 parts by weight of a curing agent, 100-120 parts by weight of a latent solvent, 3-methoxy-3-methyl-1-butanol (MMB) and water, wherein the latent solvent, MMB, and water have a weight ratio of 60:10-20:40-60. In one embodiment, the primer paint is prepared as below. The PVF, the assistance resin, the curing agent, the latent solvent, the MMB, the water, a pigment (optional), an anti-corrosion agent (optional), a thermal stabilizer (optional), and auxiliary agent (optional) are mixed, stirred, and ground, and then filtered by a filtering sieve with an appropriate mesh (e.g. 300 mesh) to obtain the primer paint. Note that if the assistance resin is liquid type, only the solid content of the assistance resin will be considered in the weight ratio, and the solvent or another solvent of the assistance resin will not be considered in the weight ratio.

In one embodiment, the PVF can be Tedlar TPVF 116 powder (solid content=100%) commercially available from DuPont. The assistance resin can be aqueous polyester resin, aqueous acrylic resin, aqueous phenoxy resin, aqueous epoxy resin, aqueous epoxy-polyester resin, or a combination thereof. In one embodiment, the aqueous acrylic resin includes water-soluble acrylic polyol resin, emulsion type acrylic polyol resin, water-soluble styrene-acrylic acid copolymer polyol resin (e.g. ETERWAT 1611 commercially available from Eternal Materials Co. Ltd.), emulsion type styrene-acrylic acid copolymer polyol resin, or a combination thereof. In one embodiment, the aqueous polyester resin includes water-soluble polyester polyol resin (e.g. WP-536 commercially available from Shang-Hai Sure Win Company, 5050-B-75 commercially available from Eternal Materials Co. Ltd., Uradil SZ-250-M1-40 or Uradil SZ-251-G3Z-70 commercially available from DSM), emulsion type polyester polyol resin (WP-850 commercially available from Shang-Hai Sure Win Company), aqueous acrylate modified polyester resin (e.g. Uradil SZ-260-G3-65 commercially available from DSM), or a combination thereof. In one embodiment, the aqueous phenoxy resin can be PKHW-34, PKHW-35, or PKHW-38 commercially available from Inchem Company, U.S.A. In one embodiment, the aqueous epoxy resin can be EM-0434AN commercially available from AKEKA, Japan or BECKOPDX EP386W/5WA commercially available from Cytec, U.S.A. In one embodiment, the aqueous epoxy-polyester resin can be DUROXYN VAX6127W/42WA, VEF 2406W/45WA, or VEF4380W/35WA commercially available from Cytec, U.S.A., or a combination thereof. Too much assistance resin may negatively influence the interlayer adhesion between the primer paint and the finish paint. While the assistance resin and the PVF have a relatively low compatibility, too much assistance resin may reduce the physical and chemical properties of the coating. More assistance resin also increases the curing agent, thereby overly increasing the crosslinking density to reduce the folding endurance (T-bend) of the coating. Too little assistance resin may lower the adhesion between the primer paint and the substrate, and lower the adhesion between the substrate and the coating dipped in boiling water.

The curing agent can be aqueous amino resin, aqueous isocyanate resin, or a combination thereof. In one embodiment, the aqueous amino resin can be full methyl etherified melamine formaldehyde resin (e.g. CYMEL 303LF commercially available from Allnex or MR-603 LF commercially available from ChangChun Chemical Co., Ltd.) partial methyl etherified melamine formaldehyde resin (e.g. ETERMINO 9603-80 commercially available from Eternal Materials Co. Ltd.), high NH type melamine formaldehyde resin (M-40WT or M-50WT commercially available from ChangChun Chemical Co., Ltd.), hybrid etherified melamine formaldehyde resin such as methyl eterified and n-butyl alcohol etherified melamine formaldehyde resin (MR-2130 commercially available from ChangChun Chemical Co., Ltd., wherein the methyl etherified melamine formaldehyde resin and the n-butyl alcohol etherified melamine formaldehyde resin have a ratio of 3:1; or MR-2131 commercially available from ChangChun Chemical Co., Ltd., wherein the methyl etherified melamine formaldehyde resin and the n-butyl alcohol etherified melamine formaldehyde resin have a ratio of 2:1), methyl eterified and i-butyl alcohol etherified melamine formaldehyde resin (MR-2161 commercially available from ChangChun Chemical Co., Ltd., wherein the methyl etherified melamine formaldehyde resin and the i-butyl alcohol etherified melamine formaldehyde resin have a ratio of 3:1), aqueous highly alkyl etherified benzol melamine resin (e.g. CYMEL 1123 or MYCOAT 137 commercially available from Allnex or a combination thereof), or a combination thereof. In one embodiment, the aqueous amino resin is partial methyl etherified melamine formaldehyde resin, aqueous highly alkyl etherified benzol melamine resin, or a combination thereof. In one embodiment, the end capped aqueous isocyanate resin is selected. The aqueous isocyanate resin can be climate resistant and non-yellowing, such as Rhodocat WT-1000 commercially available from Perstorp Company, BI 200, BI 201, or BI 220 commercially available from Baxenden Chemical, or a combination thereof. Too much curing agent may reduce the folding endurance (T-bend) of the coating. Too little curing agent may lower the adhesion between the primer paint and the substrate, and lower the adhesion between the substrate and the coating when dipped in boiling water.

The latent solvent cannot dissolve any PVF at room temperature, but can completely dissolve the PVF over 100° C. for helping the film formation of the PVF. In one embodiment, the latent solvent can be N-methyl pyrrolidinone, N-ethyl pyrrolidinone, dimethylacetamide, dimethylformamide, propylene carbonate, ethylene carbonate, butylene carbonate, γ-butyrolactone, sulfolane, or a combination thereof. In one embodiment, the latent solvent includes propylene carbonate, sulfolane, or a combination thereof. In one embodiment, the latent solvent is sulfolane. Note that when the latent solvent is propylene carbonate, ethylene carbonate, or butylene carbonate, the paint should be stored at a low temperature. Because the propylene carbonate, ethylene carbonate, or butylene carbonate will react with water with the existence of metal oxide, thereby forming carbon dioxide to destabilize the paint during storage. A primer paint with too much latent solvent may increase the VOC content thereof, thereby enhancing the temperature and increasing the period of the drying and curing step to increase energy consumption. In addition, the coating easily sags in the spray coating system due to too much latent solvent. Too much latent solvent may also degrade its compatibility with the aqueous assistance resin in the primer paint, thereby negatively influencing the film formability of the primer paint. Too little latent solvent in the primer paint may reduce the film formability of the coating, and further negatively influence the physical resistance, the chemical resistance, and the climate resistance of the coating, because the latent solvent will be partially vaporized and dissolve the PVF along with the increased temperature while baking the paints. An insufficient amount of latent solvent cannot completely dissolve the PVF to efficiently form a film of the PVF, such that a part of the PVF film may become cracked due to poor film formability. In a worse case, the PVF film cannot be formed, and a powdering phenomenon of the PVF occurs directly.

The alcohol ether solvent 3-methoxy-3-methyl-1-butanol (MMB) in the disclosure is hydrophilic, lipophilic, and environmental friendly, which can be dissolved in most of the solvents and completely dissolved with water. The MMB/water system may form a cluster structure, which has hydrogen bondings with strong interaction. As such, the PVF primer paint and finish paint including the MMB in the disclosure may prevent the coating sagging without any other anti-sagging agent. In addition, an appropriate amount of MMB in the PVF paint may increase the film formability of the PVF coating, such that the edge of the PVF coating is not easily shrunk. MMB in the formulation of the disclosure mainly functions as anti-sagging and a coalescing agent for forming the PVF film. The coating easily sags due to an overly low amount of MMB. Too much MMB is equal to too little latent solvent on the paint composition, thereby negatively influencing the film paintability of the PVF paint. The coating easily sags due to an overly high amount of water in the paint, thereby reducing the film formability of the coating and further negatively influencing the physical and chemical resistance of the coating. Too little water in the paint may increase the VOC content.

Subsequently, the finish paint is applied onto the primer paint, wherein the finish paint includes 100 parts by weight of PVF, 100 to 120 parts by weight of a latent solvent, MMB, and water. The PVF finish paint including MMB may prevent the paint from sagging without any other anti-sagging agent. If another amphiprotic solvent such as ethylene glycol butyl ether, diethylene glycol butyl ether, dipropylene glycol methyl ether, or a combination thereof is used to replace the MMB, the coating will sag and form defects on the coating surface. The latent solvent, the MMB, and the water in the finish paint have a weight ratio of 50: 10-20: 30-60. The finish paint and the primer paint are then baked and dried to form a coating. In one embodiment, the finish paint is prepared as indicated below. The PVF, the latent solvent, the MMB, the water, the pigment (optional), and the auxiliary agent (optional) are mixed, stirred, and ground, and then filtered by a filtering sieve with an appropriate mesh (e.g. 300 mesh) to obtain the finish paint. The PVF, the latent solvent, and the MMB in the finish paint are similar to those in the primer paint, and the detailed descriptions thereof are omitted here. In one embodiment, the PVF and the latent solvent in the finish paint are similar to those in the primer paint. A finish paint with too much latent solvent may increase the VOC content thereof, thereby enhancing the temperature and increasing the period of the drying and curing step to increase the energy consumption. In addition, the coating easily sags in the spray coating system due to too much latent solvent. Too little latent solvent in the finish paint may reduce the film formability of the coating, and further negatively influence the physical resistance, the chemical resistance, and the climate resistance of the coating, because the latent solvent will be partially vaporized and dissolve the PVF along with the increased temperature during baking. An insufficient amount of latent solvent cannot completely dissolve the PVF to efficiently form a film of the PVF, such that a part of the PVF film may become cracked due to poor film formability. In a worse case, the PVF film cannot be formed, and a powdering phenomenon of the PVF may occur directly. The coating easily sags due to an overly low amount of MMB. Too much MMB is equal to too little latent solvent in the paint, thereby reducing the film formability of the coating and further influencing the physical and chemical resistance of the coating. The coating sags easily due to an overly high amount of water, thereby reducing the film formability of the coating and further negatively influencing the physical and chemical resistance of the coating. Too little water may increase the VOC content.

The primer paint is then applied onto the substrate, and the finish paint is then applied onto the primer paint. The method of applying the primer paint and the finish paint can be a general coating method, such as spray coating, flow coating, blade coating, spin-on coating, roll coating, or the like. The substrate is put into an oven, baked at 215° C. to 235° C. without an air blast for 2 to 5 minutes, and then baked at 180° C. to 205° C. under an air blast for 8 to 15 minutes. Alternatively, the substrate is baked in an oven at 280° C. to 350° C. with a micro cyclic air for 2 to 5 minutes, baked at 240° C. under an air blast for 5 minutes, baked at 180° C. to 200° C. under the air blast for 10 to 15 minutes, and then cooled to room temperature. The oven temperature is fine-tuned according to the substrate thickness, and a thicker substrate needs a higher oven temperature and a longer baking period. The baking step will remove the latent solvent, the solvent, the MMB, and the water, in which the assistance resin and the curing agent of the primer paint are reacted to form the primer coating. In addition, the baking step also removes the latent solvent, the MMB, and the water to form the finish coating on the primer coating. As such, the process of the two spray coatings (of the wet-to-wet type) and one baking can be achieved.

In one embodiment, the baked coating has a total thickness of 25 µm to 35 µm. Too thick a coating needs a thicker wet film, such that the coating easily sags during curing and drying. Too thin a coating may degrade the physical and chemical properties thereof. In one embodiment, the baked primer paint has a thickness of 10 µm to 15 µm, and the baked finish paint has a thickness of 15 µm to 20 µm. Because the coating thickness should be within an appropriate range, an overly thick finish paint is equal to an overly thin primer paint, thereby reducing the adhesion between the coating and the substrate. On the other hand, an overly thick primer paint is equal to an overly thin finish paint, thereby reducing chemical resistance, solvent resistance, and climate resistance of the bi-layered coating.

A pigment such as an inorganic color powder in any color can be added into the primer paint and the finish paint. Examples of the inorganic color powder include, but are not limited to, white powder (e.g. titanium white powder, pearl powder, or zinc sulfide), black powder (e.g. cobalt copper manganese oxide, carbon black, copper manganese oxide, or iron oxide), yellow powder (e.g. titanium yellow or bismuth yellow), green powder (e.g. cobalt green or chromium oxide green), and blue powder (e.g. cobalt chromium aluminum oxide, aqueous aluminum slurry). The color powder can be used alone or in combination. The color powders of the primer paint and the finish paint can be selected to have the same color. Alternatively, white, gray, or pale yellow can be selected for the primer paint, and the a deeper color can be selected for the finish paint to cover the primer paint color.

In one embodiment, an auxiliary agent can be added into the primer paint and the finish paint. The auxiliary agent is not limited to any type, which should not negatively influence the purpose of the disclosure. The auxiliary agent can be an anti-corrosion agent, a dispersing agent, a wetting agent, an anti-foaming agent, or a combination thereof.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

The names and the sources of the chemicals in Examples are listed below, but the chemicals were not limited to those.

PVF was Tedlar TPVF 116 powder (solid content=100%) commercially available from DuPont.

Aqueous acrylic resin was ETERWAT 1611 (solid content=51%, water content=28%, butyl cellosolve (BCS) content=18%, and dimethylethanolamine content=3%) commercially available from Eternal Materials Co. Ltd.

Aqueous polyester resin was WP-850 (solid content=30%, water content=30%, and BCS content=40%) commercially available from Shang-Hai Sure Win Company, or ETERKYD 5050-B-75 (solid content=75% and BCS content=25%) commercially available from Eternal Materials Co. Ltd.

Aqueous phenoxy resin was PKHW-34 (solid content=34%, water content=52%, n-butanol content=4%, dimethylethanolamine content=3%, and propylene glycol propyl ether content=7%) commercially available from Inchem Company, U.S.A.

Aqueous epoxy resin was EM-043AN (solid content=30%, propylene glycol propyl ether content=10%, and water content=60%) commercially available from ADEKA, Japan.

Aqueous epoxy-polyester resin was Duroxyn VAX 6127W/42WA (solid content=42% and water content=58%) commercially available from Cytec, U.S.A.

Aqueous amino resin was CYMEL 1123 (solid content=100%) commercially available from Allnex, or ETERMINO 9603-80 (solid content=80% and methanol/isobutanol content=20%) commercially available from Eternal Materials Co. Ltd.

Aqueous isocyanate resin was Rhodocat™ WT-1000 (solid content=63%, water content=35%, and butyl acetate content=2%) commercially available from Perstorp Company, Switzerland.

Propylene carbonate was commercially available from ShanDong Shida ShengHua Chemical Group Co., Ltd.

Sulfolane was commercially available from Guanghua Chemical (Yingkou) Co., Ltd., China.

3-methoxy-3-methyl-1-butanol was MMB commercially available from Kuraray Company, Japan.

Ethylene glycol butyl ether (butyl cellosolve, BCS) was commercially available from Dow Chemical.

Titanium white powder was TIOXIDE TR-81 commercially available from Huntsman.

Dispersing agent was DISPERBYK-190 commercially available from BYK, Germany.

Wetting agent was CoatOSil 1211 commercially available from Momentive, U.S.A.

Thermal stabilizer was sodium formate (commercially Perstorp) and epoxy resin Celloxide 2021P (commercially available from DAICEL Company, Japan).

Anti-corrosion agent was Z-Plex 111 commercially available from HALOX, U.S.A.

Test plate was AL type with a thickness of 0.64 mm (aluminum substrate with a surface treated by chromium) commercially available from Q-Panel, U.S.A.

Test plate was aluminum plate (after chromate coating) with a thickness of 3.5 mm commercially available from Everharvest Coating Co. Ltd., Taiwan.

Example 1

Preparing a primer paint: 100 g of TPVF 116 powder, 135 g of the aqueous acrylic resin ETERWAT 1611, 100 g of propylene carbonate serving as the latent solvent, 33.3 g of MMB, 67 g of water, 30.5 g of the aqueous amino resin ETERMINO 9603-80, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 100 g of propylene carbonate serving as the latent solvent, 20 g of MMB, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 2

Preparing a primer paint: 100 g of TPVF 116 powder, 225 g of the aqueous polyester resin WP-850, 100 g of sulfolane serving as the latent solvent, 33.3 g of MMB, 100 g of water, 24.5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 110 g of sulfolane serving as the latent solvent, 22 g of MMB, 110 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of the aluminum plate (after chromate coating) with a thickness of 3.5 mm, and the finish paint was then coated on the primer paint. The test plate was put into an oven, and then baked at 350° C. for 3 minutes under a micro cyclic air, then baked at 240° C. for 3 minutes, then baked at 200° C. for 15 minutes under an air blast, and then cooled to room temperature to obtain a coating.

Example 3

Preparing a primer paint: 100 g of TPVF 116 powder, 205 g of the aqueous phenoxy resin PKHW-34, 110 g of propylene carbonate serving as the latent solvent, 36 g of MMB, 74 g of water, 47.6 g of the aqueous isocyanate resin WT-1000, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 120 g of propylene carbonate serving as the latent solvent, 48 g of MMB, 96 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 4

Preparing a primer paint: 100 g of TPVF 116 powder, 80 g of the aqueous polyester resin ETERKYD 5050-B-75, 110 g of sulfolane serving as the latent solvent, 18.5 g of MMB, 110 g of water, 20 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 100 g of sulfolane serving as the latent solvent, 40 g of MMB, 120 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of the aluminum plate (after chromate coating) with a thickness of 3.5 mm, and the finish paint was then coated on the primer paint. The test plate was put into an oven, and then baked at 340° C. for 3 minutes under a micro cyclic air, then baked at 240° C. for 3 minutes, then baked at 200° C. for 15 minutes under an air blast, and then cooled to room temperature to obtain a coating.

Example 5

Preparing a primer paint: 100 g of TPVF 116 powder, 100 g of the aqueous polyacrylic resin ETERWAT 1611, 50 g of aqueous phenoxy resin PKHW-34, 120 g of propylene carbonate serving as the latent solvent, 40 g of MMB, 120 g of water, 6.5 g of the aqueous amino resin ETERMINO 9603-80, 19.5 g of aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 110 g of sulfolane serving as the latent solvent, 44 g of MMB, 77 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 6

Preparing a primer paint: 100 g of TPVF 116 powder, 75 g of the aqueous polyacrylic resin ETERWAT 1611, 40 g of aqueous polyester resin ETERKYD 5050-B-75, 55 g of propylene carbonate and 55 g of sulfolane serving as the latent solvent, 36 g of MMB, 74 g of water, 14.5 g of the aqueous amino resin CYMEL 1123, 16 g of aqueous isocyanate resin WT-1000, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 60 g of propylene carbonate and 60 g of sulfolane serving as the latent solvent, 36 g of MMB, 108 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 7

Preparing a primer paint: 100 g of TPVF 116 powder, 75 g of the aqueous polyacrylic resin ETERWAT 1611, 100 g of aqueous polyester resin WP-850, 120 g of sulfolane serving as the latent solvent, 20 g of MMB, 80 g of water, 12.5 g of the aqueous amino resin ETERMINO 9603-80, 10 g of the aqueous amino resin CYMEL 1123, 7.5 g of aqueous isocyanate resin WT-1000, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 120 g of sulfolane serving as the latent solvent, 24 g of MMB, 96 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 8

Preparing a primer paint: 100 g of TPVF 116 powder, 73.8 g of the aqueous epoxy-polyester resin VAX6127W/42WA, 110 g of sulfolane serving as the latent solvent, 20 g of MMB, 87 g of water, 5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 120 g of sulfolane serving as the latent solvent, 24 g of MMB, 96 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Example 9

Preparing a primer paint: 100 g of TPVF 116 powder, 110 g of the aqueous epoxy resin EM-043AN, 110 g of sulfolane serving as the latent solvent, 20 g of MMB, 87 g of water, 5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 120 g of sulfolane serving as the latent solvent, 24 g of MMB, 96 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

The compositions of Examples 1 to 9 are listed in Table 1.

TABLE 1

| | | Example 1 | | Example 2 | | Example 3 | | Example 4 | |
|---|---|---|---|---|---|---|---|---|---|
| | | Primer paint | Finish paint | Primer paint | Finish paint | Primer paint | Finish paint | Primer paint | Finish paint |
| | PVF (TPVF 116) | 100 | 100 | 100 | 100 | 100 | 100 | 100 | 100 |
| Assistance resin | Aqueous acrylic resin ETERWAT 1611 | 135 | / | | / | | / | | |
| | Aqueous polyester resin WP-850 | | | 225 | | | | | |
| | Aqueous phenoxy resin PKHW-34 | | | | | 205 | | | |
| | Aqueous polyester resin ETERKYD 5050-B-75 | | | | | | | 80 | |
| Latent solvent | Propylene carbonate | 100 | 100 | | | 110 | 120 | | |
| | Sulfolane | | | 100 | 110 | | | 110 | 100 |
| Amphiprotic solvent | MMB | 33.3 | 20 | 33.3 | 22 | 36 | 48 | 18.5 | 40 |
| Water | | 67 | 60 | 100 | 110 | 74 | 96 | 110 | 120 |
| Curing agent | Aqueous amino resin ETERMINO 9603-80 | 30.5 | | | | | | | |
| | Aqueous amino resin CYMEL 1123 | | | 24.5 | | | | 20 | |
| | Aqueous isocyanate resin WT-1000 | | | | | | 47.6 | | |

TABLE 1-continued

| | | | | | | | | | |
|---|---|---|---|---|---|---|---|---|---|
| Auxiliary agent | Dispersing agent | 2 | 1 | 2 | 1 | 2 | 1 | 2 | 1 |
| | Wetting agent | 2.0 | 3.0 | 2.0 | 3.0 | 2.0 | 3.0 | 2.0 | 3.0 |
| | Thermal stabilizer | 0.5 | 1.0 | 0.5 | 1.0 | 0.5 | 1.0 | 0.5 | 1.0 |
| | Anti-corrosion agent | 10 | / | 10 | / | 10 | / | 10 | / |
| Color powder | Titanium white powder | 60 | 45 | 60 | 45 | 60 | 45 | 60 | 45 |

| | | Example 5 | | Example 6 | | Example 7 | | Example 8 | | Example 9 | |
|---|---|---|---|---|---|---|---|---|---|---|---|
| | | Primer paint | Finish paint | Primer paint | Finish paint | Primer paint | Finish paint | Primer paint | Finish paint | Primer paint | Finish paint |
| | PVF | 100 | 100 | 100 | 100 | 100 | 100 | 100 | 100 | 100 | 100 |
| Assistance resin | Aqueous acrylic resin ETERWAT 1611 | 100 | | 75 | / | 75 | | | | | |
| | Aqueous polyester resin WP-850 | | | | | | 100 | | | | |
| | Aqueous phenoxy resin PKHW-34 | 50 | | | | | | | | | |
| | Aqueous polyester resin ETERKYD 5050-B-75 | | | 40 | | | | | | | |
| | Aqueous epoxy-polyester resin VAX6127W/42WA | | | | | | | 73.8 | | | |
| | Aqueous epoxy resin EM-043AN | | | | | | | | | 110 | |
| Latent solvent | Propylene carbonate | 120 | | 55 | 60 | | | | | | |
| | Sulfolane | | 110 | 55 | 60 | 120 | 120 | 110 | 120 | 110 | 120 |
| Amphiprotic solvent | MMB | 40 | 44 | 36 | 36 | 20 | 24 | 20 | 24 | 20 | 24 |
| | Water | 120 | 77 | 74 | 108 | 80 | 96 | 87 | 96 | 87 | 96 |
| Curing agent | Aqueous amino resin ETERMINO 9603-80 | 6.5 | | | | 12.5 | | | | | |
| | Aqueous amino resin CYMEL 1123 | 19.5 | | 14.5 | | 10 | | 5 | | 5 | |
| | Aqueous isocyanate resin WT-1000 | | | 16 | | 7.5 | | | | | |
| Auxiliary agent | Dispersing agent | 2 | 1 | 2 | 1 | 2 | 1 | 2 | 1 | 2 | 1 |
| | Wetting agent | 2.0 | 3.0 | 2.0 | 3.0 | 2.0 | 3.0 | 2.0 | 3.0 | 2.0 | 3.0 |
| | Thermal stabilizer | 0.5 | 1.0 | 0.5 | 1.0 | 0.5 | 1.0 | 0.5 | 1.0 | 0.5 | 1.0 |
| | Anti-corrosion agent | 10 | / | 10 | / | 10 | / | 10 | / | 10 | / |
| Color powder | Titanium white powder | 60 | 45 | 60 | 45 | 60 | 45 | 60 | 45 | 60 | 45 |

Comparative Example 1

Without Assistance Resin

Preparing a primer paint: 100 g of TPVF 116 powder, 100 g of propylene carbonate serving as the latent solvent, 33.3 g of MMB, 67 g of water, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 100 g of propylene carbonate serving as the latent solvent, 20 g of MMB, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Comparative Example 2

Too Little MMB

Preparing a primer paint: 100 g of TPVF 116 powder, 135 g of the aqueous acrylic resin ETERWAT 1611, 100 g of propylene carbonate serving as the latent solvent, 15 g of MMB, 67 g of water, 24.5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 100 g of propylene carbonate serving as the latent solvent, 18 g of MMB, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Comparative Example 3

Too much MMB

Preparing a primer paint: 100 g of TPVF 116 powder, 135 g of the aqueous acrylic resin ETERWAT 1611, 100 g of propylene carbonate serving as the latent solvent, 40 g of MMB, 67 g of water, 24.5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a finish paint: 100 g of TPVF 116 powder, 100 g of propylene carbonate serving as the latent solvent, 50 g of MMB, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the primer paint was coated on the test plate of AL type with a thickness of 0.64 mm (aluminum substrate with a surface treated by chromium) commercially available from Q-Panel, and the finish paint was then coated on the primer paint. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Comparative Example 4

Only the Primer Paint

Preparing a primer paint: 100 g of TPVF 116 powder, 135 g of the aqueous acrylic resin ETERWAT 1611, 110 g of sulfolane serving as the latent solvent, 27.5 g of MMB, 74 g of water, 24.5 g of the aqueous amino resin CYMEL 1123, 2 g of the dispersing agent, 2 g of the wetting agent, 0.5 g of the thermal stabilizer (0.47 g of the epoxy resin Celloxide 2021P and 0.03 g of sodium formate), 10 g of the anti-corrosion agent, and 60 g of the titanium white powder were mixed, stirred, and ground until the paint had a particle size of less than 10 μm, and then filtered by a filtering sieve of 300 mesh to obtain the primer paint.

Preparing a coating: the primer paint was coated on the test plate of AL type with a thickness of 0.64 mm (aluminum substrate with a surface treated by chromium) commercially available from Q-Panel. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Comparative Example 5

Only the Finish Paint

Preparing a finish paint: 100 g of TPVF 116 powder, 100 g of sulfolane serving as the latent solvent, 40 g of MMB, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 μm, and then filtered by a filtering sieve of 300 mesh to obtain the finish paint.

Preparing a coating: the finish paint was coated on the test plate of AL type with a thickness of 0.64 mm (aluminum substrate with a surface treated by chromium) commercially available from Q-Panel. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

Comparative Example 6

Only the Finish Paint, and MMB was Replaced with BCS

Preparing a finish paint: 100 g of TPVF 116 powder, 100 g of sulfolane serving as the latent solvent, 40 g of BCS, 60 g of water, 1 g of the dispersing agent, 3 g of the wetting agent, 1 g of the thermal stabilizer (0.94 g of the epoxy resin Celloxide 2021P and 0.06 g of sodium formate), and 45 g of the titanium white powder were mixed, stirred, and ground until the paint had a particle size of less than 10 µm, and then filtered by a filtering sieve of 300 mesh to obtain the finish paint.

Preparing a coating: the finish paint was coated on the test plate of AL type with a thickness of 0.64 mm (aluminum substrate with a surface treated by chromium) commercially available from Q-Panel. The test plate was put into an oven, and then baked at 280° C. for 3 minutes under a micro cyclic air, then baked at 240° C. for 3 minutes, then baked at 200° C. for 15 minutes under an air blast, and then cooled to room temperature to obtain a coating.

The compositions of Comparative Examples 1 to 6 are listed in Table 2.

The properties of the coatings in Examples 1 to 9 and Comparative Examples 1 to 6 were measured by following methods, which are listed in Table 3.

Brightness of the coatings was measured according to American Society for Testing and Materials standard ASTM D523.

Thickness of the coatings was measured according to American Society for Testing and Materials standard ASTM D7091.

Hardness of the coatings was measured according to Japan Industrial Standard JIS K 5400.

Film formability of the coatings was observed by the human eye.

Acid resistance of the coatings was measured according to Japan Industrial Standard JIS K 5400.

Alkaline resistance of the coatings was measured according to Japan Industrial Standard JIS K 5400.

MEK resistance of the coatings was measured according to American Society for Testing and Materials standard ASTM D5402.

Folding endurance (T-bend) of the coatings was measured according to American Society for Testing and Materials standard ASTM D4145.

Impact resistance of the coatings was measured according to American Architectural Manufacturers Association standard AAMA 2605-05.

Adhesion between the test plate and the coating and interlayered adhesion of the coating in a dry state and after being dipped in boiling water for 2 hours were measured according to American Architectural Manufacturers Association standard AAMA_2605-05 with a difference of the coating being further treated in boiling water for 2 hours to measure adhesion.

TABLE 2

| | | Comparative Example 1 | | Comparative Example 2 | | Comparative Example 3 | | Comparative Example 4 | Comparative Example 5 | Comparative Example 6 |
|---|---|---|---|---|---|---|---|---|---|---|
| | | Primer paint | Finish paint | Primer paint | Finish paint | Primer paint | Finish paint | Only the primer paint | Only the finish paint | Only the finish paint |
| Assistance resin | PVF | 100 | 100 | 100 | 100 | 100 | 100 | 100 | 100 | 100 |
| | Aqueous acrylic resin ETERWAT 1611 | / | / | 135 | / | 135 | / | 135 | | |
| Latent solvent | Propylene carbonate | 100 | 100 | 100 | 100 | 100 | 100 | | | |
| | Sulfolane | | | | | | | 110 | 100 | 100 |
| Amphiprotic solvent | MMB | 33.3 | 20 | 15 | 18 | 40 | 50 | 27.5 | 40 | |
| | BCS | | | | | | | | | 40 |
| | Water | 67 | 60 | 67 | 60 | 67 | 60 | 74 | 60 | 60 |
| Curing agent | Aqueous amino resin CYMEL 1123 | | | 24.5 | | 24.5 | | 24.5 | | |
| Auxiliary agent | Dispersing agent | 2 | 1 | 2 | 1 | 2 | 1 | 2 | 1 | 1 |
| | Wetting agent | 2 | 3 | 2 | 3 | 2 | 3 | 2 | 3 | 3 |
| | Thermal stabilizer | 0.5 | 1 | 0.5 | 1 | 0.5 | 1 | 0.5 | 1 | 1 |
| | Anti-corrosion agent | 10 | / | 10 | / | 10 | / | 10 | / | / |
| Color powder | Titanium white powder | 60 | 45 | 60 | 45 | 60 | 45 | 60 | 45 | 45 |

TABLE 3

| Properties | Example 1 | Example 2 | Example 3 | Example 4 | Example 5 | Example 6 |
| --- | --- | --- | --- | --- | --- | --- |
| Film thickness (μm) | 30-32 | 30-32 | 30-32 | 30-32 | 30-32 | 30-32 |
| Brightness | 35-45° | 30-40° | 25-30° | 30-35° | 35-40° | 35-40° |
| Adhesion between the substrate and the coating in dry state | 100/100 | 100/100 | 100/100 | 100/100 | 100/100 | 100/100 |
| Inter layered adhesion in dry state | 100/100 | 100/100 | 100/100 | 100/100 | 100/100 | 100/100 |
| Adhesion between the substrate and the coating after being treated in boiling water | 100/100 | 100/100 | 100/100 | 100/100 | 100/100 | 100/100 |
| Inter layered adhesion after being treated in boiling water | 100/100 | 100/100 | 100/100 | 100/100 | 100/100 | 100/100 |
| Folding endurance (T-bend) | 0-1T | 0-1T | 1-2T | 0-1T | 0-1T | 0-1T |
| Impact resistance | No crack | No crack | No crack | No crack | No crack | No crack |
| Pencil hardness | 2H | 2H | 2H | 2H | 2H | 2H |
| Film formability | Excellent | Excellent | Excellent | Excellent | Excellent | Excellent |
| MEK scratch resistance | The gloss of the coating was not loss after MEK scratching back and forth 200 times | The gloss of the coating was not loss after MEK scratching back and forth 200 times | The gloss of the coating was not loss after MEK scratching back and forth 200 times | The gloss of the coating was not loss after MEK scratching back and forth 200 times | The gloss of the coating was not loss after MEK scratching back and forth 200 times | The gloss of the coating was not loss after MEK scratching back and forth 200 times |
| Acid resistance (5% HCl) | No bubble after being treated by alkaline for 21 days | No bubble after being treated by alkaline for 21 days | No bubble after being treated by alkaline for 21 days | No bubble after being treated by alkaline for 21 days | No bubble after being treated by alkaline for 21 days | No bubble after being treated by alkaline for 21 days |
| Acid resistance (10% $H_2SO_4$) | No bubble after being treated by alkaline for 30 days | No bubble after being treated by alkaline for 30 days | No bubble after being treated by alkaline for 30 days | No bubble after being treated by alkaline for 30 days | No bubble after being treated by alkaline for 30 days | No bubble after being treated by alkaline for 30 days |
| Alkaline resistance (10% NaOH) | No bubble after being treated by alkaline for 30 days | No bubble after being treated by alkaline for 30 days | No bubble after being treated by alkaline for 30 days | No bubble after being treated by alkaline for 30 days | No bubble after being treated by alkaline for 30 days | No bubble after being treated by alkaline for 30 days |

| Properties | Example 7 | Example 8 | Example 9 |
| --- | --- | --- | --- |
| Film thickness (μm) | 30-32 | 30-32 | 30-32 |
| Brightness | 35-40° | 35-38° | 35-40° |
| Adhesion between the substrate and the coating in dry state | 100/100 | 100/100 | 100/100 |
| Inter layered adhesion in dry state | 100/100 | 100/100 | 100/100 |
| Adhesion between the substrate and the coating after being treated in boiling water | 100/100 | 100/100 | 100/100 |

TABLE 3-continued

| | | | |
|---|---|---|---|
| Inter layered adhesion after being treated in boiling water | 100/100 | 100/100 | 100/100 |
| Folding endurance (T-bend) | 0-1T | 0-1T | 0T |
| Impact resistance | No crack | No crack | No crack |
| Pencil hardness | 2H | 2H | 2H |
| Film formability | Excellent | Excellent | Excellent |
| MEK scratch resistance | The gloss of the coating was not loss after MEK scratching back and forth 200 times | The gloss of the coating was not loss after MEK scratching back and forth 200 times | The gloss of the coating was not loss after MEK scratching back and forth 200 times |
| Acid resistance (5% HCl) | No bubble after being treated by alkaline for 21 days | No bubble after being treated by alkaline for 21 days | No bubble after being treated by alkaline for 21 days |
| Acid resistance (10% $H_2SO_4$) | No bubble after being treated by alkaline for 30 days | No bubble after being treated by alkaline for 30 days | No bubble after being treated by alkaline for 30 days |
| Alkaline resistance (10% NaOH) | No bubble after being treated by alkaline for 30 days | No bubble after being treated by alkaline for 30 days | No bubble after being treated by alkaline for 30 days |

| Properties | Comparative Example 1 | Comparative Example 2 | Comparative Example 3 | Comparative Example 4 | Comparative Example 5 | Comparative Example 6 |
|---|---|---|---|---|---|---|
| Film thickness (μm) | 30-32 | 30-32 | 30-32 | 30-32 | 30-32 | — |
| Brightness | 30-40 | 20-25 | 20-25 | 45-50 | 35-40 | — |
| Adhesion between the substrate and the coating in dry state | 0/100 | 100/100 | 100/100 | 0/100 | 0/100 | — |
| Inter layered adhesion in dry state | — | 100/100 | 100/100 | — | — | — |
| Adhesion between the substrate and the coating after being treated in boiling water | — | 0/100 | 0/100 | 50/100 | — | — |
| Inter layered adhesion after being treated in boiling water | — | — | — | — | — | — |
| Folding endurance (T-bend) | Peeling | 2T | 2T | 3T | Peeling | — |
| Impact resistance | Peeling | No crack | No crack | No crack | Peeling | — |
| Pencil hardness | 2H | 2H | 2H | 3H | H | — |
| Film formability | Excellent | Powdering edge and local cracking | Rough surface, sagging bottom, and powdering edge | Excellent | Excellent | Serious sagging at substrate surface and shrinkage at edge |
| MEK scratch resistance | — | — | — | Exposing the substrate after MEK scratching back and forth 100 times | — | — |
| Acid resistance (5% HCl) | — | — | — | bubble after being treated by alkaline for 2 days | — | — |

TABLE 3-continued

| | | | | | | |
|---|---|---|---|---|---|---|
| Acid resistance (10% $H_2SO_4$) | — | — | — | bubble after being treated by alkaline for 7 days | — | — |
| Alkaline resistance (10% NaOH) | — | — | — | bubble after being treated by alkaline for 7 days | — | — |

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A water dilutable polyvinyl fluoride paint, comprising:
100 parts by weight of a first polyvinyl fluoride;
30-70 parts by weight of an assistance resin;
5-30 parts by weight of a curing agent;
100-120 parts by weight of a latent solvent;
3-methoxy-3-methyl-1-butanol; and
water,
wherein the latent solvent, 3-methoxy-3-methyl-1-butanol, and water have a weight ratio of 60: 10-20: 40-60.

2. The water dilutable polyvinyl fluoride paint as claimed in claim 1, wherein the assistance resin is aqueous polyester resin, aqueous acrylic resin, aqueous phenoxy resin, aqueous epoxy resin, aqueous epoxy-polyester resin, or a combination thereof.

3. The water dilutable polyvinyl fluoride paint as claimed in claim 1, wherein the curing agent is aqueous amino resin, aqueous isocyanate resin, or a combination thereof.

4. The water dilutable polyvinyl fluoride paint as claimed in claim 1, wherein the latent solvent is N-methyl pyrrolidinone, N-ethyl pyrrolidinone, dimethylacetamide, dimethylformamide, propylene carbonate, ethylene carbonate, butylene carbonate, γ-butyrolactone, sulfolane, or a combination thereof.

5. A water dilutable polyvinyl fluoride paint, comprising:
100 parts by weight of a second polyvinyl fluoride;
100-120 parts by weight of a latent solvent;
3-methoxy-3-methyl-1-butanol; and
water,
wherein the latent solvent, 3-methoxy-3-methyl-1-butanol, and water have a weight ratio of 50: 10-20: 30-60.

6. The water dilutable polyvinyl fluoride paint as claimed in claim 5, wherein the latent solvent is N-methyl pyrrolidinone, N-ethyl pyrrolidinone, dimethylacetamide, dimethylformamide, propylene carbonate, ethylene carbonate, butylene carbonate, γ-butyrolactone, sulfolane, or a combination thereof.

7. A coating, comprising:
a primer coating, including a product of reacting 100 parts by weight of a first polyvinyl fluoride; 30-70 parts by weight of an assistance resin; and 5-30 parts by weight of a curing agent; and
a finish coating on the primer coating, wherein the finish coating includes 100 parts by weight of a second polyvinyl fluoride.

8. The coating as claimed in claim 7, wherein the assistance resin is aqueous polyester resin, aqueous acrylic resin, aqueous phenoxy resin, aqueous epoxy resin, aqueous epoxy-polyester resin, or a combination thereof.

9. The coating as claimed in claim 7, wherein the curing agent is aqueous amino resin, aqueous isocyanate resin, or a combination thereof.

10. A method of manufacturing a coating, comprising:
applying a primer paint on a substrate, wherein the primer paint includes 100 parts by weight of a first polyvinyl fluoride, 30-70 parts by weight of an assistance resin, 5-30 parts by weight of a curing agent, 100-120 parts by weight of a first latent solvent, 3-methoxy-3-methyl-1-butanol, and water, wherein the first latent solvent, 3-methoxy-3-methyl-1-butanol, and water have a weight ratio of 60:10-20:40-60;
applying a finish paint on the primer paint, wherein the finish paint includes 100 parts by weight of a second polyvinyl fluoride, 100-120 parts by weight of a second latent solvent, 3-methoxy-3-methyl-1-butanol, and water, wherein the second latent solvent, 3-methoxy-3-methyl-1-butanol, and water have a weight ratio of 50:10-20:30-60; and
baking and drying the primer paint and the finish paint to form a coating.

11. The method as claimed in claim 10, wherein the assistance resin is aqueous polyester resin, aqueous acrylic resin, aqueous phenoxy resin, aqueous epoxy resin, aqueous epoxy-polyester resin, or a combination thereof.

12. The method as claimed in claim 10, wherein the curing agent is aqueous amino resin, aqueous isocyanate resin, or a combination thereof.

13. The method as claimed in claim 10, wherein each of the first latent solvent and the second latent solvent is independently N-methyl pyrrolidinone, N-ethyl pyrrolidinone, dimethylacetamide, dimethylformamide, propylene carbonate, ethylene carbonate, butylene carbonate, γ-butyrolactone, sulfolane, or a combination thereof.

* * * * *